United States Patent
Zheng et al.

(10) Patent No.: US 11,989,823 B2
(45) Date of Patent: May 21, 2024

(54) METHOD FOR RENDERING ON BASIS OF HEMISPHERICAL ORTHOGONAL FUNCTION

(71) Applicant: NANJING INSTITUTE OF ASTRONOMICAL OPTICS & TECHNOLOGY, NATIONAL ASTRONOMICAL OBSERVATORIES, CAS, Jiangsu (CN)

(72) Inventors: Yi Zheng, Jiangsu (CN); Kai Wei, Jiangsu (CN); Bin Liang, Jiangsu (CN); Ying Li, Jiangsu (CN); Changpeng Ding, Jiangsu (CN)

(73) Assignee: NANJING INSTITUTE OF ASTRONOMICAL OPTICS & TECHNOLOGY, NATIONAL ASTRONOMICAL OBSERVATORIES, CAS, Jiangsu (CN)

(*) Notice: Subject to any disclaimer, the term of this patent is extended or adjusted under 35 U.S.C. 154(b) by 85 days.

(21) Appl. No.: 17/775,531

(22) PCT Filed: Sep. 14, 2020

(86) PCT No.: PCT/CN2020/115055
§ 371 (c)(1),
(2) Date: May 9, 2022

(87) PCT Pub. No.: WO2021/063169
PCT Pub. Date: Apr. 8, 2021

(65) Prior Publication Data
US 2022/0406006 A1  Dec. 22, 2022

(30) Foreign Application Priority Data
Sep. 30, 2019 (CN) .......... 201910938907.5

(51) Int. Cl.
*G06T 15/50* (2011.01)
*G06T 15/20* (2011.01)

(52) U.S. Cl.
CPC .......... *G06T 15/506* (2013.01); *G06T 15/205* (2013.01)

(58) Field of Classification Search
CPC ....... G06T 15/06; G06T 15/205; G06T 17/00; G06T 15/50; G06T 15/506
See application file for complete search history.

(56) References Cited

U.S. PATENT DOCUMENTS

| | | | |
|---|---|---|---|
| 7,091,973 B1* | 8/2006 | Cohen | G06T 15/50 345/426 |
| 2007/0229502 A1* | 10/2007 | Tong | G06T 15/55 345/426 |
| 2018/0197309 A1* | 7/2018 | Cole | H04N 13/232 |

FOREIGN PATENT DOCUMENTS

| | | | |
|---|---|---|---|
| CN | 106600674 A | 4/2017 | |
| CN | 107085518 A | 8/2017 | |
| CN | 110728748 A | 1/2020 | |

* cited by examiner

*Primary Examiner* — Phi Hoang
(74) *Attorney, Agent, or Firm* — Muncy, Geissler, Olds & Lowe, P.C.

(57) ABSTRACT

The invention discloses a method for rendering on the basis of hemispherical orthogonal function, the method comprising the following steps: selecting rendering fragments and establishing a local coordinate system; acquiring a bidirectional reflectance distribution function of a material; if global illumination is an orthogonal function, determining a rotation matrix of an orthogonal function coefficient according to the rotation angles of the global coordinate system and the local coordinate system, and calculating a local orthogonal function illumination coefficient; converting the local orthogonal function illumination coefficient into a hemispherical orthogonal function illumination coefficient; sam- (Continued)

pling to obtain the spatial distribution of a bidirectional reflection distribution function of a rendered material; obtaining a hemispherical orthogonal function of the bidirectional reflection distribution function of the rendered material; and using the dot product of a hemispherical orthogonal function coefficient of illumination and a hemispherical orthogonal function coefficient of the bidirectional reflection distribution function of the rendered material and accumulating to obtain the light intensity in the reflection direction. A hemispherical harmonic function(HSH) is used to fit measurement data or theoretically derived data of a BRDF, which may avoid the difficulty of fitting that accurs for a hemispherical harmonics function due to data being missing in the lower hemisphere.

2 Claims, 2 Drawing Sheets

METHOD FOR RENDERING ON BASIS OF HEMISPHERICAL ORTHOGONAL FUNCTION

TECHNICAL FIELD

The invention belongs to the technical field of three-dimensional computer image processing, and specifically relates to a rendering method based on a hemispherical orthogonal function.

TECHNICAL BACKGROUND

In computer graphics rendering, the object is discretized into a lot of fragments. According to the material reflection characteristics of the fragments and the incident light emissivity, it is calculated to obtain the reflected emissivity in a specific direction is the core of rendering. This process can be calculated by formula (1):

$$L_o(\theta_o,\varphi_o) = \int_{\varphi_i=0}^{2\pi} \int_{\theta_i=0}^{\pi/2} f_r(\theta_i,\varphi_i,\theta_o,\varphi_o) \cdot L_i(\theta_i,\varphi_i) \cdot \cos\theta_i \cdot \sin\theta_i d\theta_i d\varphi_i$$

where:

$L_o$ Is along the center P of the element on the object Radiance of reflected light in direction $(\theta_o,\varphi_o)$;

$L_i$ Is along P Radiance of incident light in direction $(\theta_i,\varphi_i)$;

$f_r$ Is the bidirectional reflection distribution function BRDF (Bidirectional Reflectance Distribution Function) of the rendered material, which is defined as the ratio of the increment of reflected emissivity $dL_r$ (radiance) in a given direction $(\theta_r,\phi_r)$ to the increment of irradiance $dE_i$ (irradiance) in the incident direction $(\theta_i,\phi_i)$, see formula (2), which describes the model of how the incident light from different directions is distributed in each exit direction after being reflected by a specific surface;

$$BRDF(\theta_i, \phi_i; \theta_r, \phi_r) = \frac{dL_r(\theta_i, \phi_i; \theta_r, \phi_r)}{dE_i(\theta_i, \phi_i)}$$

$\theta_i$ Is the zenith angle of incident light (in the local coordinate system of the rendered material), The range of $\theta_i$ is 0 to $\pi/2$.

$\varphi_i$ Is the azimuth angle of the incident light (in the local coordinate system of the rendered material), the range of $\varphi_i$ is 0 to $2\pi$.

The integration is performed in the upper half of the rendered fragment, which is a hemispherical space.

The complexity of the reflection characteristics is mainly reflected in the following three aspects:

First of all, BRDF is a function of 4 variables, with high dimensionality, and low efficiency in expression, storage and calculation;

Secondly, it is difficult to calculate the incident light radiance, especially when global illumination is considered. It is necessary to calculate both direct illumination and environmental occlusion and indirect illumination between objects, which requires a large amount of calculation;

Finally, the two-dimensional integration on the hemisphere also requires a large amount of calculation.

Obtaining the reflected emissivity in a specific direction is the core of computer graphics rendering. The currently obtained methods have their own shortcomings in the required time, calculation accuracy, and scope of application.

SUMMARY OF THE INVENTION

The purpose of the implementation of the present invention is to provide a real-time rendering method based on a new hemispherical orthogonal function in view of the shortcomings of the prior art, thereby improving the technical effect of the frame rate and fidelity of rendering.

In order to achieve the above objectives, the present invention provides the following technical solutions:

Method for rendering on the basis of hemispherical orthogonal function, including the following steps:

S1: Select the rendering tablet, establish a local coordinate system;

S2: Get the bidirectional reflection distribution function of the material;

S3: Determine if the global light is an orthogonal function; if it is, step S4 and S5; if not, proceeds to step S4' and S5';

S4: Determine the rotation matrix of the orthogonal function coefficient according to the corner of the global coordinate system and the local coordinate system, and calculate the local orthogonal function of the local orthogonal function;

S5: According to the equivalent formula, the local orthogonal function is converted to a hemispheric orthogonal function; the hemisphere orthogonal function includes three types of hemispherical harmonic functions, ZerniKe hemisphere functions, and vertical hemisphere functions;

S4': Sampling of the upper half of the ball, obtaining the spatial distribution of light;

S5': Fit light distribution with hemisphere orthogonal functions, obtains the slime orthogonal function of the light; the hemispicular orthogonal function includes a hemispherical harmonic function, the zernike hemisphere function, and the vertical hemisphere function;

S6: Determines the direction of the reflected light, the spatial distribution of the two-way reflection distribution function of the rendered material is obtained;

S7: Fit the two-way reflection distribution function of the rendered material with a hemisphere orthogonal function, and obtain a hemisphere orthogonal function factor of the two-way reflection distribution function of the rendered material;

S8: The hemisphere orthogonal function coefficient of light is multiplied by the half-way reflection distribution function of the rendered material and accumulates the light intensity of the reflection direction.

Furthermore, the method is characterized in that With a hemispheric orthogonal function, the bidirectional distribution function of the incident light and the material is converted from the airspace to the frequency domain, and the radiation in the reflection direction is obtained by multiplication in the frequency domain.

Furthermore, the method is characterized in that The hemispherical harmonic function HSH:

$$HSH_n^m(s, \varphi) = (-1)^{|m|} \sqrt{\frac{(2n+1)}{2} \frac{(n-|m|)!}{(n+|m|)!}} \cdot P_n^{|m|}\{\cos(\theta)\} \cdot \Phi_m(\varphi),$$

$$\binom{n = 0,2,4, \ldots; m = 0, \pm 2, \ldots, \pm n}{n = 1,3,5, \ldots; m = \pm 1, \pm 3, \ldots, \pm n}$$

Where, $\theta$ is the top angle; $\varphi$ Is a square angle;

$$P_n^{|m|}(x) = \frac{(-1)^{|m|}}{2^n n!}(1-x^2)^{\frac{|m|}{2}}\left(\frac{d}{dx}\right)^{n+|m|}(x^2-1)^n.$$

Furthermore, the method is characterized in that The Zernik Hemisphere Function ZSF:

$$ZSF_n^m(t, \varphi) = \sqrt{2(n+1)} \cdot R_n^m(t) \cdot \Phi_m(\varphi),$$

$$\begin{pmatrix} n = 0,2,4, \ldots ; m = 0, \pm 2, \ldots, \pm n \\ n = 1,3,5, \ldots ; m = \pm 1, \pm 3, \ldots, \pm n \end{pmatrix}$$

Where, $R_n^m(t) = \sum_{k=0}^{(n-|m|)/2} \frac{(-1)^k(n-k)!}{k!\left(\frac{n+|m|}{2}-k\right)!\left(\frac{n-|m|}{2}-k\right)!} t^{n-2k}.$ Furthermore, the method is characterized in that The longitudinal hemisphere function LSF:

$$LSF_n^m(w, \varphi) = \sqrt{\frac{2^{|m|+2.5}}{\gamma_v^{(a,b)}}} w^{|m|} J\left(\frac{n-|m|}{2}, 0, \frac{2|m|-1}{2}, 2w^2 - 1\right) \cdot \Phi_m(\varphi),$$

$$\begin{pmatrix} n = 0,2, \ldots ; m = 0, \pm 2, \ldots, \pm n \\ n = 1,3, \ldots ; m = \pm 1, \pm 3, \ldots, \pm n \end{pmatrix}$$

Where, $J(v, a, b, x) = \frac{1}{v!}\sum_{k=0}^{v} \frac{(-v)_k(a+b+v+1)_k(a+k+1)_{v-k}}{k!}\left(\frac{1-x}{2}\right)^k.$ Compared with the prior art, the present invention has the following advantages:

1. The expression of BRDF and incident light is more effective, and the fitting process is numerically stable. Using the hemispherical harmonic function HSH to fit BRDF measurement data or theoretically derived data can avoid the difficulty of fitting the spherical harmonic function due to the missing data in the lower hemisphere (the fitting result has a large amplitude and is sensitive to measurement noise).

2. If global illumination is expressed by spherical harmonic function, this method provides a fast equivalent conversion method of global illumination spherical harmonic function coefficients to hemispherical illumination function coefficients in the local coordinate system, which improves the calculation speed.

3. The Fourier transform on the hemispherical surface is used to calculate the reflected illuminance in the frequency domain. Compared with the method of convolution in the spatial domain, the multiplication in the frequency domain has the advantages of less calculation, fast speed, and the cutoff frequency can be selected according to the fineness of rendering.

DETAILED DESCRIPTION

The rendering method based on the hemispherical orthogonal function of the present invention mainly includes:

(1) Select the patch for rendering, obtain its position, orientation and material reflectance characteristics.

(2) Using the hemispherical functions to fit the incident light and obtain its representation by coefficients (3) Using the hemispherical functions to fit the bidirectional distribution function along specific perspective direction and obtain its representation by coefficients.

(4) Based on the orthogonal property of hemispherical functions, the two-dimensional integral in rendering equation can be calculated by dot product of illumination coefficients and BRDF coefficients.

Here the hemispherical functions are hemispherical harmonics (HSH), Zernkie hemispherical functions (ZHF) and Longitudinal hemispherical functions (LHF).

Optimizely, in step (2) if the illumination is not expressed by spherical harmonics, operations in step (2-2) will be carried. Otherwise, operations in step (2-2) will be carried.

(2-1) Ray tracing is used to calculate the intensity of illumination light from different directions to the rendering patch over its upper hemisphere. Then the distribution is fitted by hemispherical functions and coefficients of illumination are obtained.

(2-2) The illumination has been expressed as spherical functions. HSH is preferred to use. An approach is present to efficiently convert spherical function coefficients in global coordinates to HSH coefficients in local coordinate system. The specific implementation of the present invention will be further described below in conjunction with the drawings and embodiments.

Figure 1:
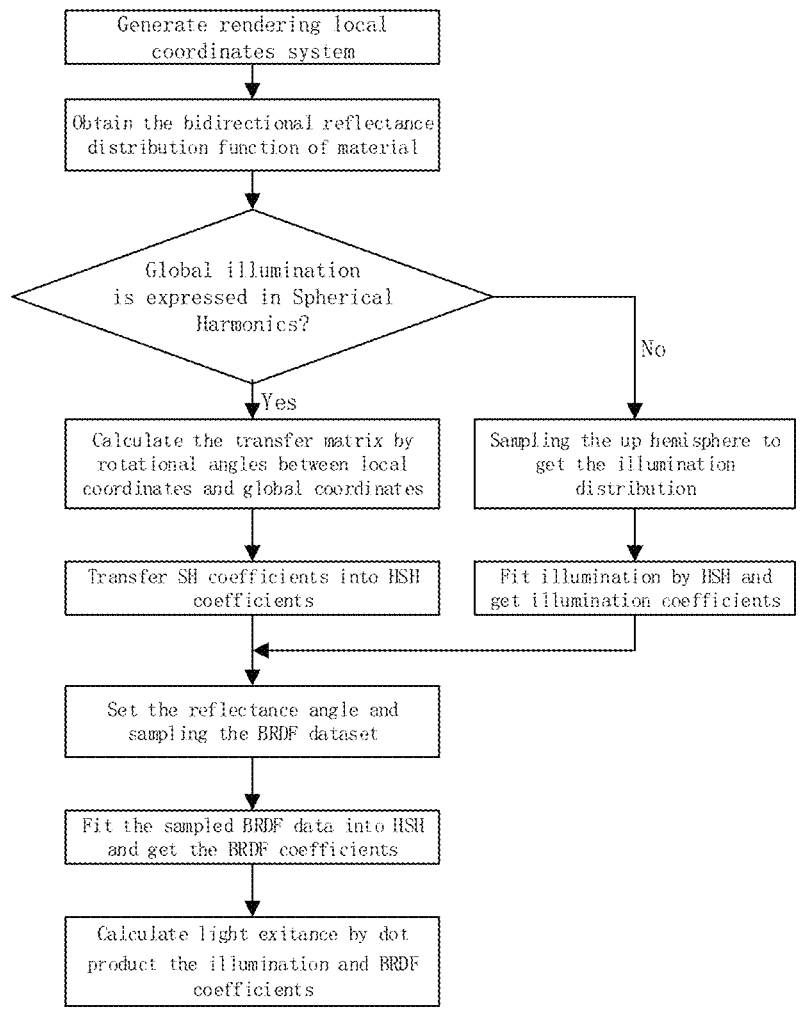
FIG. 1 illustrates a flowchart of image rendering algorithm based on hemispherical functions.

The detailed process to perform the presented method will be described using diagrams. FIG. 1 illustrates a flowchart of image rendering algorithm based on hemispherical functions.

Step 1: Select the patch for rendering, establish local coordinates systems for rendering.

Figure 2:
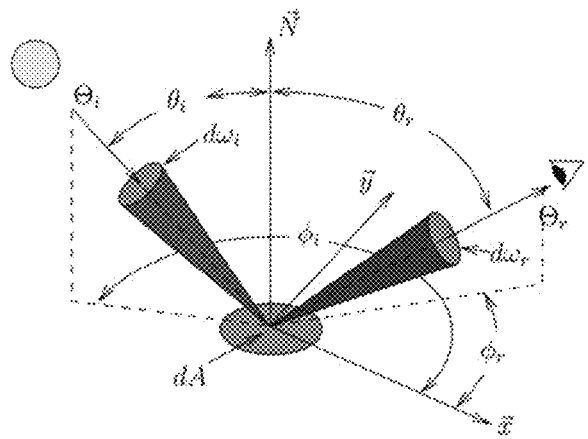
FIG. 2 illustrates the definition of bidirectional reflectance distribution function (BRDF).

Step 1.1: Obtain patch center position P in space $\{x_p, y_p, z_p\}$, its normal direction $\vec{n}$ and material BRDF. The definition of BRDF is illustrated in FIG. 2 where dA is patch being rendered, $\vec{N}$ is the normal direction of the patch, $\vec{x}$ is the positive x direction for local coordinates. $\vec{y}$ is the positive y direction for local coordinates. $\vec{z}$ is the positive z direction for local coordinates. $\theta_i$ is the polar angle of incident light. $\varphi_i$ is the azimuth angle of incident light. $d\omega_i$ is the differential solid angle along incident direction. $\theta_r$ is the polar angle of reflectance light. $\varphi_r$ is the azimuth angle of reflectance light. $d\omega_r$ is the differential solid angle along reflectance direction.

Step 1.2: Establish the local rendering coordinates system. Position P is the origin. Normal direction $\vec{n}$ is the Z positive direction. Two perpendicular direction X and Y are selected to match with BRDF directions to simplify the computation.

Step 2: Using the hemispherical functions to fit the incident light and obtain its representation by coefficients. Hemispherical functions are hemispherical harmonics (HSH), Zernkie hemispherical functions (ZHF) and Longitudinal hemispherical functions (LHF), in which:

(1) The expression of the hemispherical harmonic function (HSH) is as follows:

$$HSH_n^m(s, \varphi) = (-1)^{|m|}\sqrt{2(2n+1)\frac{(n-|m|)!}{(n+|m|)!}} \cdot P_n^{|m|}\{\cos(\theta)\} \cdot \Phi_m(\varphi),$$

$$\begin{pmatrix} n = 0,2,4, \ldots ; m = 0, \pm 2, \ldots, \pm n \\ n = 1,3,5, \ldots ; m = \pm 1, \pm 3, \ldots, \pm n \end{pmatrix}$$

among them $P_n^{|m|}$ Is associated Legendre Polynomials (Associated Legendre

Polynomials), which is expressed as follows:

$$P_n^{|m|}(x) = \frac{1}{2^n n!}(1-x^2)^{\frac{|m|}{2}}\left(\frac{d}{dx}\right)^{n+|m|}(x^2-1)^n$$

(2) The expression of Zernkie hemispherical functions (ZHF) is as follows:

$$ZSF_n^m(t,\varphi) = \sqrt{2(n+1)} \cdot R_n^m(t) \cdot \Phi_m(\varphi),$$

$$\begin{pmatrix} n=0,2,4,\ldots; m=0,\pm2,\ldots,\pm n \\ n=1,3,5,\ldots; =\pm1,\pm3,\ldots,\pm n \end{pmatrix}$$

among them $R_n^m(t)$ Is a Zernike polynomial, expressed as follows:

$$R_n^m(t) = \sum_{k=0}^{(n-|m|)/2} \frac{(-1)^k (n-k)!}{k!\left(\frac{n+|m|}{2}-k\right)!\left(\frac{n-|m|}{2}-k\right)!} t^{n-2k};$$

$$w = 1 - \cos(\theta);$$

(3) The expression of the longitudinal spherical function (LSF) is as follows:

$$LSF_n^m(w,\varphi) = \sqrt{\frac{2^{|m|+2.5}}{\gamma_v^{(a,b)}}} w^{|m|} J\left(\frac{n-|m|}{2}, 0, \frac{2|m|-1}{2}, 2w^2-1\right) \cdot \Phi_m(\varphi),$$

$$\begin{pmatrix} n=0,2,\ldots; m=0,\pm2,\ldots,\pm n \\ n=1,3,\ldots; m=\pm1,\pm3,\ldots,\pm n \end{pmatrix}$$

$$t = \sqrt{2}\,\sin(\theta/2)$$

Where J is the Jacobi polynomial, as shown below:

$$J(v,a,b,x) = \frac{1}{v!}\sum_{k=0}^{v}\frac{(-v)_k(a+b+v+1)_k(a+k+1)_{v-k}}{k!}\left(\frac{1-x}{2}\right)^k$$

This embodiment only uses the hemispherical harmonic function HSH as an example to describe the method of the present invention in detail. The application methods of the Zernike hemispherical function ZSF and the longitudinal hemispherical function LSF are the same as the hemispherical harmonic function HSH, and will not be repeated here.

Step 2.1: Calculate the illumination HSH coefficients by fitting

Step 2.1.1: Discrete the upper hemispherical space into different directions. The discrete number is s. Use ray tracing or voxels tracing approach, the illumination intensities along these directions are obtained. Use a vector to record the result as:

$$\vec{L}_i = [l_i^1\ l_i^2\ \cdots\ l_i^s]^T$$

Step 2.1.2: Use HSH functions degree no more than n to fit the illumination light and obtain the fitting coefficients.

The total number of functions is N (N=(n+1)*(n+2)/2). Use a vector to record the results.

$$\vec{A} = [a_1\ a_2\ \cdots\ a_N]^T$$

And the incident light can be approximated as following.

$$L_i(\theta_i, \varphi_i) = \sum_{l=1}^{N} a_l \cdot HSH_l(\theta_i, \varphi_i)$$

Step 2.2: Calculate the illumination HSH coefficients by rotating SH. In some circumstance, the illumination is represented by spherical harmonics. An approach is put forward to make an efficient transfer.

Step 2.2.1: Rotate the global illumination to local rendering coordinates system. The global illumination is recorded as a set of spherical harmonic coefficients as following.

$$\vec{E} = [\varepsilon_0^1\ \varepsilon_0^2\ \cdots\ \varepsilon_0^N]^T$$

The Euler angle between global system and local rendering system can be calculated and denoted as $\alpha$, $\beta$, $\gamma$. Let name the illumination coefficients in local coordinates as $\vec{E}_r$.

$$\vec{E}_r = [\varepsilon_r^1\ \varepsilon_r^2\ \cdots\ \varepsilon_r^N]^T$$

Then the transfer calculation can be carried by equation.

$$\vec{E}_r = R_{SH}(\alpha,\beta,\gamma) \cdot \vec{E}_0$$

where $R_{SH}(\alpha,\beta,\gamma)$ is the rotational matrix for spherical harmonics. It can be derived by recursive method, or by ZXZXZ approach.

Step 2.2.2: Transfer the local illumination SH coefficients into equivalent HSH coefficients. The formula of equivalent transfer is listed.

$$\begin{cases} SH_n^m(\theta,\varphi) = \sum_{k=0}^{\infty} \gamma_{n,m}^{m+2k,m} \cdot HSH_{m+2k}^m(\theta,\varphi) \\ \gamma_{n,m}^{m+2k,m} = \langle SH_n^m, HSH_{m+2k}^m \rangle/(2\pi) \end{cases}$$

Where $\langle U,V \rangle$ is the integral of function of U and V over hemispherical surface.

$$\langle U,V \rangle = \int_0^{\pi/2}\int_0^{2\pi} U(\theta,\varphi) \cdot V(\theta,\varphi) \cdot \sin\theta \cdot d\theta \cdot d\varphi$$

If (n−m) is an even number, $SH_n^m(\theta,\varphi) = HSH_n^m(\theta,\varphi)$, the coefficient of $SH_n^m(\theta,\varphi)$ equals to the coefficient of $HSH_n^m(\theta,\varphi)$. If (n−m) is odd, the calculation of transferring factor $\gamma_{n,m}^{m+2k,m}$ is carried to perform the equivalent transfer calculation.

For example, $$SH_1^0(\theta,\varphi) = \frac{\sqrt{3}}{2}HSH_0^0(\theta,\varphi) +$$

$$\frac{\sqrt{15}}{8}HSH_2^0(\theta,\varphi) - \frac{\sqrt{3}}{16}HSH_4^0(\theta,\varphi) + \frac{\sqrt{39}}{128}HSH_6^0(\theta,\varphi) - \ldots$$

$$SH_2^1(\theta,\varphi) = \frac{3\sqrt{5}}{8}HSH_1^1(\theta,\varphi) +$$

$$\frac{\sqrt{70}}{16}HSH_3^1(\theta,\varphi) - \frac{5\sqrt{11}}{128}HSH_5^1(\theta,\varphi) + \frac{\sqrt{63}}{128}HSH_7^1(\theta,\varphi) - \ldots$$

Set an truncation to get an acceptable transfer precision.

Step 2.2.3: Combining like items, equivalent HSH coefficients are Calculated.

$$a_n^m = \sum_{k=0}^{\infty} \varepsilon_r^{m+k,m} \cdot \gamma_{m+k,m}^{n,m}$$

among them $\varepsilon_r^{m+k,m}$ Is the coefficient of spherical harmonic illumination function in the local coordinate system, take an example as coefficient $a_0^0$ for $HSH_0^0(\theta,\varphi)$ $$a_1 = a_0^0 = \varepsilon_r^{0,0} \cdot \gamma_{0,0}^{0,0} + \varepsilon_r^{1,0} \cdot \gamma_{1,0}^{0,0} + \varepsilon_r^{2,0} \cdot \gamma_{2,0}^{0,0} + \varepsilon_r^{3,0} \cdot \gamma_{3,0}^{0,0} + \ldots$$

$$= 1.0 \cdot \varepsilon_r^{0,0} + \frac{\sqrt{3}}{2} \cdot \varepsilon_r^{1,0} + 0.0 \cdot \varepsilon_r^{2,0} - \frac{\sqrt{7}}{8} \cdot \varepsilon_r^{3,0} + \ldots$$

Optimization1: Since HSH and SH have the same part in expression, half of the conversion coefficient is a one-to-one conversion, which is beneficial to calculation. ZSF and LSF do not have this advantage, and the calculation speed will be slower, so HSH is preferred.

Optimization2: The transfer matrix from SH to HSH is fixed, and the conversion coefficient is calculated in advance and does not need to be performed in real time. Therefore, this conversion requires less calculation and fast execution speed. So far, regardless of the calculation method 1 or 2, the hemispheric function fitting coefficient of the incident light irradiance $\vec{A}=[a_1\ a_2\ \cdots a_N]^T$ can be obtained.

Step 3: Using the hemispherical functions to fit the bidirectional distribution function along specific perspective direction and obtain its representation by coefficients. The bidirectional reflection distribution function (BRDF) is defined as the target in a certain direction $(\theta_r,\phi_r)$ On the reflection brightness $dL_r$ and incident direction $(\theta_i,\phi_i)$ Illuminance $dE_i$ ratio. The BRDF of the material can be calculated by surface physical modeling, and the actual measurement can also be carried out by instruments.

Step 3.1: Determine the expression in the local coordinate system of the direction to calculate the reflected emissivity $(\theta_r,\varphi_r)$ Step 3.2: Fixing $(\theta_r,\varphi_r)$, then through physical models or experimental data, the influence of irradiance in each incident direction $(\theta_i,\varphi_i)$ on the emissivity in the reflection direction $(\theta_r,\varphi_r)$ is obtained, recorded as $BRDF(\theta_i,\varphi_i)\cdot\cos(\theta_i)|(\theta_r,\varphi_r)$. Obviously $BRDF(\theta_r,\varphi_r)\cdot(\theta_i)$ Is a function of the hemispherical distribution. If it has t sampling directions in the hemispherical space, the expression in the spatial domain is $\vec{F}_r=[f_r^1\ f_r^2\ \cdots\ f_r^t]^T$.

Step 3.3: Fit $\vec{F}_r$ with HSH functions degree no more than n (N terms), and obtain fitting coefficient $\vec{B}=[b_1\ b_2\ \cdots\ b_N]^T$, BRDF can use the first N HSH to express:

$$BRDF(\theta_i, \varphi_i)\cos(\theta_i) = \sum_{l=1}^{N} b_l \cdot HSH_l(\theta_i, \varphi_i)$$

Figure 3:
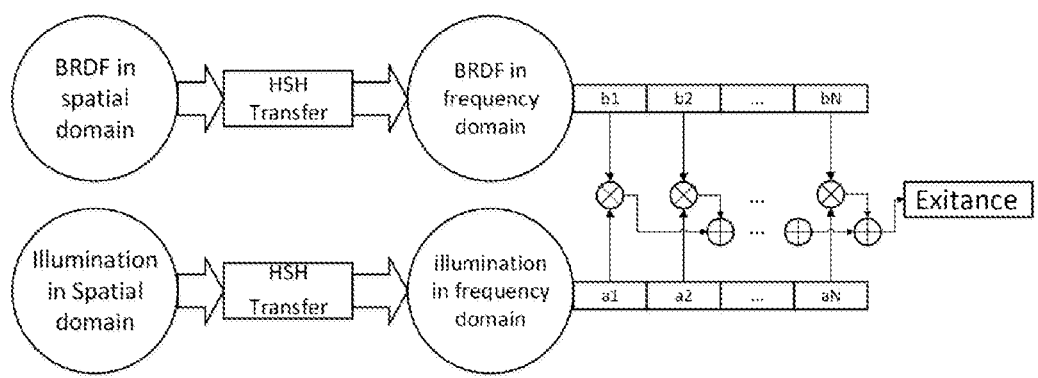
FIG. 3 is a flowchart of calculation of surface element reflection light based on hemispherical orthogonal function.

Step 4: Substitute the reflection integral formula to calculate Reflected lighting of the direction $(\theta_r,\varphi_r)$, the calculation process of surface element reflected light based on hemispherical orthogonal function is shown in FIG. 3, The specific method is as follows:

$$L_o(\theta_o, \varphi_o) = \int_{\varphi_i=0}^{2\pi}\int_{\theta_i=0}^{\pi/2} f_r(\theta_i, \varphi_i; \theta_o, \varphi_o) \cdot L_i(\theta_i, \varphi_i) \cdot \cos\theta_i \cdot \sin\theta_i d\theta_i d\varphi_i$$

$$= \int_{\varphi_i=0}^{2\pi}\int_{\theta_i=0}^{\pi/2}\left(\sum_{k=1}^{N} a_k \cdot HSH_k(\theta_i, \varphi_i)\right)\cdot\left(\sum_{l=1}^{N} b_l \cdot HSH_l(\theta_i, \varphi_i)\right)\cdot$$

$$\sin\theta_i d\theta_i d\varphi_i$$

$$= \sum_{k=1}^{N}\sum_{l=1}^{N}(a_k b_l)\cdot$$

$$\left\{\int_{\varphi_i=0}^{2\pi}\int_{\theta_i=0}^{\pi/2} HSH_k(\theta_i, \varphi_i)\cdot HSH_l(\theta_i, \varphi_i)\right\}\cdot\sin\theta_i d\theta_i d\varphi_i\right\}$$

$$= 2\pi\sum_{l=1}^{N} a_l b_l$$

The above descriptions are only preferred embodiments of the present invention, and are not intended to limit the present invention. Any modification, equivalent replacement and improvement made within the spirit and principle of the present invention shall be included in the protection scope of the present invention.

We claim:

1. A method for rendering a three-dimensional image of a material on the basis of hemispherical orthogonal function, including the following steps:
   S1: selecting a rendering tablet, and establishing a local coordinate system;
   S2: getting a bidirectional reflection distribution function of the material;
   S3: determining if global light is an orthogonal function; if it is, performing step S4 and S5; if not, proceeding to step S4' and S5';
   S4: determining a rotation matrix of an orthogonal function coefficient according to a corner of a global coordinate system and the local coordinate system, and calculating a local orthogonal function of the local coordinate system;
   S5: according to an equivalent formula, converting the local orthogonal function to the hemispherical orthogonal function; wherein the hemispherical orthogonal function includes a hemispherical harmonic function, a Zernike hemisphere function, and a vertical hemisphere function;
   S4': sampling an upper half of a ball, and obtaining a spatial distribution of light;
   S5': fitting light distribution with hemispherical orthogonal functions, obtaining a slime orthogonal function of the light;
   S6: determining a direction of reflected light, and obtaining a spatial distribution of a two-way reflection distribution function of the material;
   S7: fitting the two-way reflection distribution function of the material with the hemispherical orthogonal function, and obtaining a hemispherical orthogonal function factor of the two-way reflection distribution function of the material;
   S8: multiplying a hemispherical orthogonal function coefficient of light by a half-way reflection distribution function of the material and accumulating light intensity of a reflection direction based on the multiplied hemispherical orthogonal function coefficient of light; and
   S9: rendering the three-dimensional image of the material using the accumulated light intensity of the rejection direction.

2. The method for rendering a three-dimensional image of a material on the basis of hemispherical orthogonal function according to claim 1, wherein with the hemispherical orthogonal function, the bidirectional reflection distribution function of incident light and the material is converted from an airspace to a frequency domain, and radiation in a reflection direction is obtained by multiplication in the frequency domain.

\* \* \* \* \*